United States Patent Office 3,414,198
Patented Dec. 3, 1968

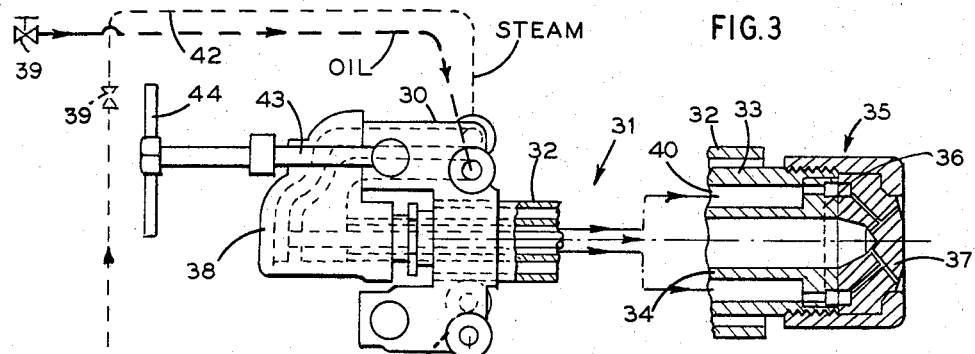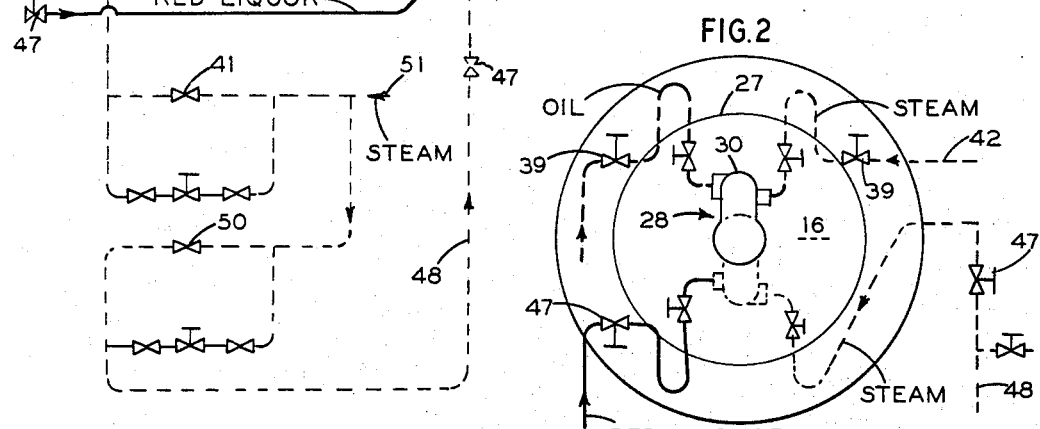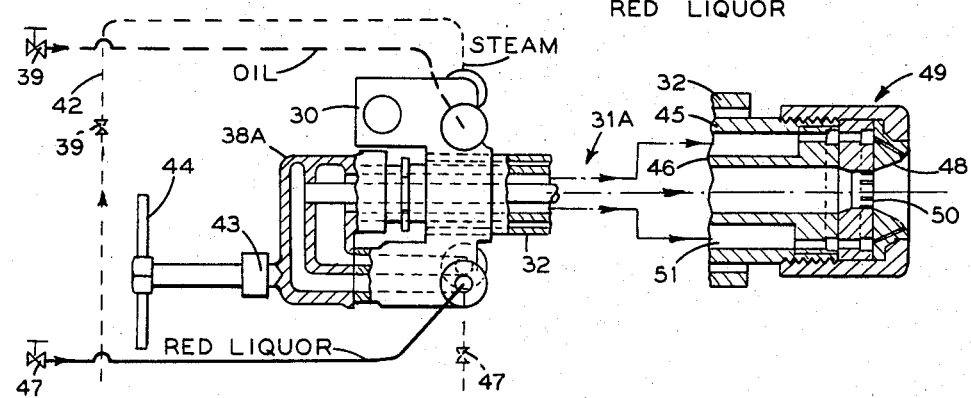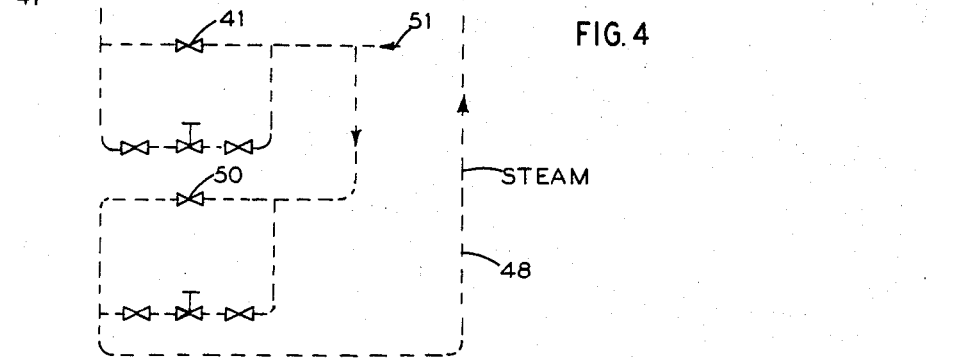

3,414,198
TWO FUEL BURNER ARRANGEMENT
William C. Wolfe, Rittman, Ohio, assignor to The Babcock & Wilcox Company, New York, N.Y., a corporation of New Jersey
Filed Apr. 8, 1966, Ser. No. 541,295
2 Claims. (Cl. 239—416.1)

ABSTRACT OF THE DISCLOSURE

A liquid fuel burner for alternate supply of high heat and low heat value liquid fuels, where the atomizing steam for each liquid fuel is supplied to the burner with the specific fuel at a selected differential pressure.

The present invention relates to the combustion of fuels, and more particularly to a burner arrangement adapted for the combustion of a relatively low heat value residual liquid fuel containing recoverable chemical constitutents and alternately or simultaneously a relatively high heat value fuel.

In the recovery of the chemical constitutents of a residual pulp liquor resulting from the digestion of wood by incineration it is sometimes necessary to burn a high heat value fuel in the combustion chamber with the liquor so as to maintain the combustion chamber temperatures above a lower value. Depending upon the construction of the furnace, it may also be desirable to burn high heat value fuel alone in the chemical recovery furnace to produce hot gases sufficient to attain full rated capacity of an associated steam generating and superheating unit.

In a known chemical recovery unit a plurality of burner ports are positioned on opposite sides of a combustion chamber so that the burner ports are oppositely aligned insofar as their location is concerned. When burning magnesium base residual liquor, for example, such a burner arrangement is effective in encouraging complete combustion of the residual liquor within the furnace so as to attain effective treatment of the chemicals in the liquor for their subsequent recombination to reform a pulp cooking liquor. Under such circumstances the furnace temperature must be maintained above a pre-determined minimum so as to insure complete combustion of the carbon constituents in the fuel. Ordinarily, the furnace is constructed and arranged to maintain temperatures above the selected minimum through an upper range of liquor firing rates. When the rate of residual liquor firing is reduced it may become necessary to fire a supplementary fuel such as oil or gas to maintain the minimum temperature in the furnace. The supplemental fuel is supplied in sufficient quantities to maintain the combustion chamber above such a minimum value.

When the furnace is water cooled such as disclosed in copending application S.N. 487,869, filed Sept. 16, 1965 (assigned to the assignee of this application), the chemical recovery equipment associated with the combustion chamber must be by-passed when the residual liquor firing rate is reduced below a lower limit, since insufficient chemicals will be preseent in the effluent gas to effectively operate such chemical recovery apparatus. However, under such conditions it still may be desirable to supply the combustion chamber with sufficient high heat value fuel to produce steam as required, without the simultaneous combustion of the residual liquor.

In general, it is possible to mix a high heat value fuel, such as oil, with the residual pulp liquor in a range of furnace operating capacities so as to maintain furnace temperatures above the preselected limit for the chemical recovery processes. However, it is not desirable to use the residual liquor burners exclusively for high heat value fuel combustion due to excessive atomizing steam demand. In this invention the opposing burners of the furnace are constructed and arranged so that any multiple of such burners may be individually supplied with high heat value fuel alone, while the other burners are utilized for the introduction of the residual pulp liquor into the furnace.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Of the drawings:

FIG. 2 is an exterior elevation of a burner assembly arranged for firing residual pulp liquor or fuel oil;

FIG. 3 is a schematic showing, partly in section, of the atomizer assembly arranged for fuel oil firing; and FIG. 4 is a schematic showing, partly in section, of the atomizer assembly arranged for residual liquor firing.

Figure 1:
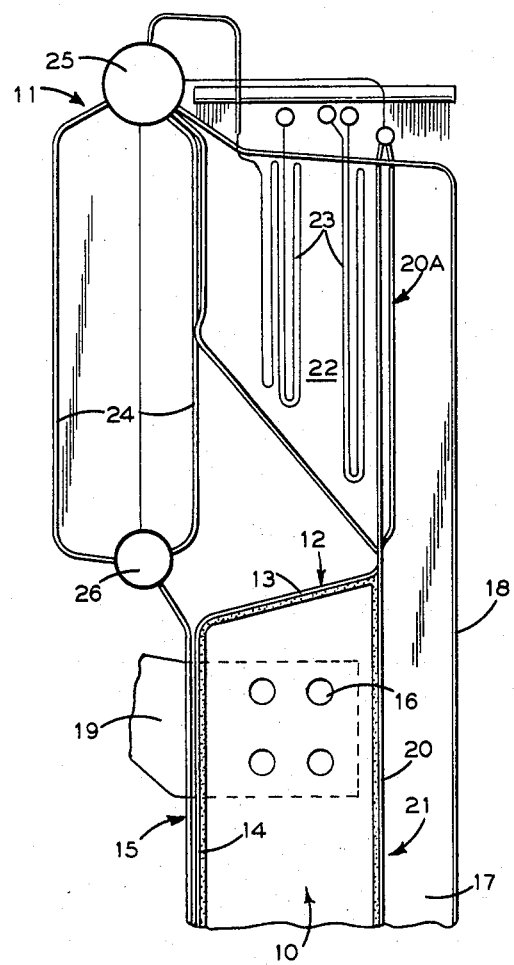
FIG. 1 is an elevation view, in section, of a portion of a combustion chamber provided with fuel burners constructed and arranged in accordance with the present invention.

As disclosed in said copending application S.N. 487,869, and shown in FIG. 1, a furnace 10 is associated with a steam generating and superheating unit 11 with the furnace walls bounded by tubes connected into the fluid flow circuit of the unit 11. The furnace 10 is upwardly elongated and provided with a roof 12 which is also lined by tubes 13 forming an extension of the tubes 14 bounding the front wall 15 of the furnace.

A plurality of burner ports 16 are positioned in the upper portion and in opposite side walls of the furnace. The burner ports 16 are positioned so that each port is axially aligned with a corresponding port in the opposite side wall. As hereinafter described each of the ports 16 is provided with a burner assembly including an air register and a liquid fuel atomizer for the admission of a combustible mixture into the furnace. Preheated air is supplied through a duct 19, with the quantity of air delivered to each burner regulated by adjustment of the air register. The products of combustion pass downwardly in the furnace to a lower outlet (not shown) through which they pass to flow upwardly through an open pass 17. As shown, the open pass 17 is lined by rows of upright tubes 18 which are also connected into the circulating system of the boiler. With the gases cooled while passing upwardly through the pass 17, the gases pass through a screen 20A formed by extensions of the tubes 20 defining the common wall 21 between the furnace 10 and the open-pass 17 to enter a passageway 22 containing rows of superheater tubes 23. Thereafter the gases pass through rows of vapor generating tubes 24 connecting upper and lower drums 25 and 26, respectively, of a conventional two drum boiler.

The furnace arrangement shown is particularly effective for the incineration of magnesium base residual liquor, but may also be useful in the combustion of other fuels. When used in the incineration of magnesium base residual liquor the furnace wall tubes are lined with refractory materials and the furnace dimensions are selected to maintain a furnace temperature above 2400° to 2500° F. when operated at full capacity. Under these conditions the organic content of the liquor will be substantially completely consumed, releasing solid particles of reactive magnesium oxide which will be entrained with the gases of combustion, containing sulphur dioxide and carbon dioxide, in moving over the heat exchange surfaces of the boiler unit 11.

When the temperature within the furnace 10 falls below a selected minimum, as may be caused by a reduction in the quantity or heat content of the residual liquor delivered to the furnace, it becomes necessary to supply supplementary fuel such as fuel oil to the furnace. This may be accomplished by converting the liquor atomizers in an opposed pair of burner ports 16 to fuel oil atomizers and to supply supplementary fuel oil to the furnace. Additional opposed pairs of burners may be converted to fuel oil firing as required. It is usually uneconomical to operate a chemical recovery furnace below about 50% of the full capacity liquor firing rate while still absorbing the $SO_2$ in the combustion gases. However, with the unit described the unit may be operated up to its full steaming capacity as a power boiler by fuel oil firing alone, if desired.

In the embodiment shown in FIG. 2, a burner port 16 is provided with a burner assembly 28, including an air register 27 of known type for controlled introduction of combustion air into the furnace. The burner assembly 28 is positioned to extend through the air register and into the burner port to discharge the liquid fuel and its atomizing steam into the furnace. The general type of burner assembly is shown in FIG. 2 of the U.S. Patent 2,812,212, where the fuel and atomizing steam connections to the atomizer assembly 31 are attached to a body portion 30 which is generally permanently secured to the air register 27. Valves 39 are provided in each of the connections to the burner body so that flow to the burner may be discontinued or selectively utilized as desired.

A distance piece 32 (see FIGS. 3 and 4) is secured in the body portion 31 to concentrically support nested tubes 33 and 34 which define separate flow paths for the atomizing steam and the fuel. The furnace ends of the concentric tubes terminate in a nozzle assembly 35 which includes a spray nozzle 36 and a sprayer plate 37 where the assembly 35 maintains the concentric arrangement of the tubes and mixes the steam and fuel for the projection of a finely divided spray of the fuel into the furnace.

Passageways in the body portion 30 are connected through passageways in a coupling member 38 to the atomizing assembly including the concentric tubes. As shown in FIG. 3, the coupling member is attached so as to supply fuel oil and atomizing steam to the fuel oil atomizing nozzle assembly 35. In this arrangement steam passes through the innermost tube 34 to the sprayer plate 37 while the fuel oil passes through the annular passageway 40 defined between the tubes 33 and 34 to the sprayer plate.

As hereinafter described in more detail, the atomizing steam delivered to the body 30 through the pipe 42 is automatically controlled to a desired pressure suitable for most economical steam use by a pressure control valve 41.

In converting the oil atomizer assembly 31 from the oil burning arrangement shown in FIG. 3 to the liquor burning assembly shown in FIG. 4, the steam and fuel valves 39 connected with the body 30 are closed and the coupling 38 is detached by loosening the attachment yoke 43 through the screw threaded wheel 44. With the coupling 38 removed, the tubes 33 and 34 with the nozzle assembly 35 attached thereto is removed as a unit. Thereafter, the liquor atomizer assembly 31A which includes the concentric, spaced tubes 45 and 46, and the nozzle assembly 49 including nozzle 48 and spray plate 50, is inserted into the distance piece 32. The coupling 38A is then installed in a position to connect the red liquor and steam connections in the body 30 so that the red liquor flows through the pipe 46 and atomizing steam passes through the annular space 51 between the tubes 45 and 46. With the coupling 38 clamped in position by the yoke 43 the valves 47 controlling flow to the burner assembly may be opened. When burning liquor the pressure of the atomizing steam delivered through the pipe 48 is controlled by the pressure control valve 50 to maintain a desired pressure differential between the liquor and the atomizing steam.

As shown in FIGS. 3 and 4, the steam pressure control valves 41 and 50 are supplied from a common steam line 51, which connects the control valves in parallel. Each pressure control valve 41 or 50 is provided with a conventional by-pass line which is supplied with a manually adjustable valve for use in case of need.

In operation of the furnace, the residual liquor will be supplied to the atomizer assembly 31A at a pressure of the order of 45 p.s.i.g. (pounds per square inch gage) for full capacity operation. The atomizing steam delivered to the burner will be regulated to a pressure of the order of 75 p.s.i.g. by the pressure regulating valve 50, for effective liquor atomization. When fuel oil is delivered to atomizer assembly 31 the oil pressure will be of the order of 75 p.s.i.g. while the corresponding atomizing steam pressure will be of the order of 110 p.s.i.g. for complete atomization of the fuel, as controlled by the pressure regulating valve 41.

What is claimed is:
1. A liquid fuel burner comprising a body member constructed to receive interchangeable atomizing assemblies each having concentric pipes arranged to form an elongated central passageway and a surrounding annular passageway and an atomizing head having discharge openings connected to the discharge end of said passageways, means forming an inlet opening in said body member adapted to be connected to said annular passageway, regulable means for supplying a high heat value liquid fuel under pressure to said inlet opening, means forming a second inlet opening in said body member adapted to be connected to said central passageway, regulable means for supplying a relatively low heat value liquid fuel to said second inlet opening under a lower pressure than the liquid fuel supplied to said first inlet opening, an atomizing steam supply system adapted to be alternatively connected to said annular passageway when low heat value liquid fuel is supplied to said central passageway and connected to said central passageway when high heat value liquid fuel is supplied to said annular passageway, and independently operable valve means for establishing and maintaining predetermined pressure differentials between said atomizing steam and said liquid fuels, whereby for a change in liquid fuel an atomizing assembly can be replaced without adjusting the pressure differential.

2. A liquid fuel burner according to claim 1 wherein said low heat value liquid fuel consists of residual pulp lqiuor, and said high heat value fuel consists of fuel oil.

References Cited

UNITED STATES PATENTS

| | | | |
|---|---|---|---|
| 562,089 | 6/1896 | Oakman et al. | 239—417.3 |
| 1,279,315 | 9/1918 | Foerst | 239—419.3 |
| 1,493,584 | 5/1924 | Wills | 239—417.3 |
| 2,616,488 | 11/1952 | Olsen | 239—417.3 |
| 2,812,212 | 11/1957 | Rogers et al. | 239—405 XR |

M. HENSON WOOD, Jr., *Primary Examiner.*

V. M. WIGMAN, *Assistant Examiner.*